C. ATWOOD.
SECURING HOOKS AND EYES TO TAPE AND DRESSES.
No. 6,628. Patented Aug. 7, 1849.
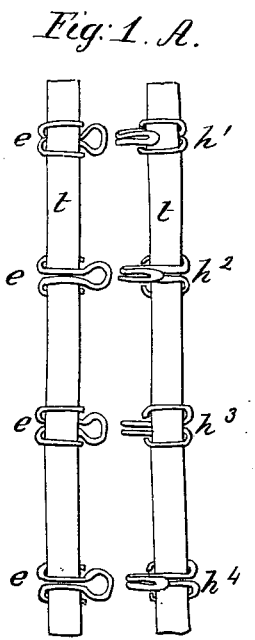
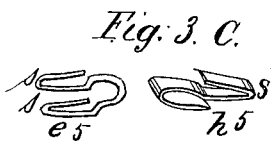

UNITED STATES PATENT OFFICE.

CHARLES ATWOOD, OF BIRMINGHAM, CONNECTICUT.

SECURING HOOKS AND EYES TO TAPE AND DRESSES.

Specification of Letters Patent No. 6,628, dated August 7, 1849.

*To all whom it may concern:*

Be it known that I, CHARLES ATWOOD, of Birmingham, (Derby,) in the county of New Haven and State of Connecticut, have invented a new and useful Improvement in Hooks and Eyes and Hook and Eye Tape for Fastening Ladies' Dresses and other Garments, which I call "Hook-Tape" or "Crochet-Tape;" and I do hereby declare that the following is a full and exact description.

The nature of my invention consists in bending and forming the shanks of hooks and eyes made of wire, and the attaching them to the tape by their shanks, in the manner hereinafter described.

To enable others skilled in the art to make and use my invention I will proceed to describe my peculiar form of bending the shanks to adapt them to the tape, and the manner in which I attach them thereto.

I make my hooks and eyes of round wire doubled and bent nearly as is usual for the hook and the eye in themselves, and by any of the machines used therefor, but the shanks both for the hook and the eye are differently bent, into oblong loops, forming, when finished, mortice-like spaces for the tape of suitable length and breadth to receive it freely; but when the hooks and eyes are made, the oblong loops or bows of their shanks may either be left a very little open, so as to admit the tape edgewise into them, and after it is inserted the clenching may be finished by slightly pressing upon the shanks with flat pliers, or by a stroke, or any other method of giving a moderate pressure; or when made, the loops may be entirely closed and sprung open by a slight force, so as to admit the tape edgewise into them, and then permitted, by the elasticity of the wire to spring back again; and by such means the bows of the shanks are made to surround and embrace the tape and thereby attached to it. To describe and explain my improved article still further, I refer to the drawings hereto annexed and forming a part of this description.

Figure 1 A, represents two pieces of tape at $t$, $t$, one of them having hooks 1, 2, 3, 4, attached to it, the other eyes, $e$, $e$, $e$, $e$, also attached, both made of doubled round wire, bent somewhat variously, and some of them represented on their hook-sides and some of them on their back-sides. In Fig. 3 $e$, 5, represents an eye somewhat differently formed with the shanks $s$, $s$, a little open for the insertion of the tape. $h$, 5, in C, represents a hook made of larger wire flattened to about one third of its thickness and used single, which makes a good hook to match with the eye made of round wire as at $e$, 5. Fig. 2 B, represents a hook of flattened wire much magnified; H, shows the hook-part and S, shows the shank part as unclenched or left a little open to receive the tape.

I do not claim any improvement in the hooks or eyes themselves, whether made of round wire or flattened wire, or flattened after they are bent, excepting only the difference in their shanks by which they are suitably formed and adapted to be attached to tape and to the same when so attached as hereinbefore described; and my hooks so adapted and constructed as hereinbefore described I call tape hooks, and when so attached to the tape as hereinbefore described, I call the article hook-tape or crochet tape.

What I claim as my invention, and desire to secure by Letters Patent is—

The oblong loop or eyelet in combination with the hook and eye so as to fasten them to garments by means of tape, and by me designated the "tape-hook" as hereinbefore described, and also the attaching of hooks and eyes to tape as hereinbefore described, so as to form the article by me designated, hook-tape.

CHS. ATWOOD.

Witnesses:
GEO. KELLOGG,
WM. B. WOOSTER.